(12) United States Patent
Miki et al.

(10) Patent No.: US 12,119,670 B2
(45) Date of Patent: Oct. 15, 2024

(54) POWER RECEPTION DEVICE FOR WIRELESS POWER SUPPLY SYSTEM

(71) Applicant: Murata Manufacturing Co., Ltd., Kyoto-fu (JP)

(72) Inventors: Osamu Miki, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 281 days.

(21) Appl. No.: 17/472,356

(22) Filed: Sep. 10, 2021

(65) Prior Publication Data

US 2021/0408835 A1 Dec. 30, 2021

Related U.S. Application Data

(63) Continuation of application No. PCT/JP2019/048099, filed on Dec. 9, 2019.

(30) Foreign Application Priority Data

Mar. 18, 2019 (JP) .................................. 2019-049333

(51) Int. Cl.
  *H02J 50/40* (2016.01)
  *H02J 7/02* (2016.01)
  *H02J 50/12* (2016.01)
  *H02J 50/70* (2016.01)

(52) U.S. Cl.
  CPC ............. *H02J 50/402* (2020.01); *H02J 7/02* (2013.01); *H02J 50/12* (2016.02); *H02J 50/70* (2016.02)

(58) Field of Classification Search
  CPC .......... H02J 50/402; H02J 50/12; H02J 50/70; H02J 7/02
  USPC ........................................................ 307/142
  See application file for complete search history.

(56) References Cited

U.S. PATENT DOCUMENTS

| | | | |
|---|---|---|---|
| 7,511,454 B1 | 3/2009 | Legg | |
| 10,276,900 B2 * | 4/2019 | Kawano | H01M 50/107 |
| 10,644,531 B1 * | 5/2020 | Qiu | H02J 50/10 |

(Continued)

FOREIGN PATENT DOCUMENTS

| | | |
|---|---|---|
| JP | 2007-053861 A | 3/2007 |
| JP | 5798407 B2 | 10/2015 |

(Continued)

OTHER PUBLICATIONS

Machine Translation WO2019044567A1 (Year: 2019).*

(Continued)

*Primary Examiner* — Michael R. Fin
(74) *Attorney, Agent, or Firm* — Studebaker & Brackett PC

(57) ABSTRACT

A power reception device includes a plurality of power-receiving coils, a plurality of rectifier elements, and a convergent output smoothing capacitor. The plurality of power-receiving coils are positioned in place relative to the housing in such a manner that the plurality of power-receiving coils each include first conductor portions extending along a side surface of the housing. The plurality of rectifier elements are connected respectively to the plurality of power-receiving coils. The convergent output smoothing capacitor stores electric energy output from the plurality of rectifier elements.

17 Claims, 7 Drawing Sheets

(56) References Cited

U.S. PATENT DOCUMENTS

| | | | |
|---|---|---|---|
| 2012/0032632 A1* | 2/2012 | Soar | H02J 50/90 |
| | | | 320/108 |
| 2013/0314035 A1 | 11/2013 | Kohlschmidt et al. | |
| 2017/0077759 A1* | 3/2017 | Niizuma | H02J 50/60 |
| 2017/0125161 A1* | 5/2017 | Teggatz | H01F 38/14 |

FOREIGN PATENT DOCUMENTS

| | | |
|---|---|---|
| JP | 2019-004628 A | 1/2019 |
| WO | 2013/133028 A1 | 9/2013 |
| WO | 2014/181462 A1 | 11/2014 |
| WO | 2015/163296 A1 | 10/2015 |
| WO | 2019/044567 A1 | 3/2019 |

OTHER PUBLICATIONS

International Search Report issued in PCT/JP2019/048099; mailed Feb. 10, 2020.
International Preliminary Report on Patentability and Written Opinion issued in PCT/JP2019/048099; issued Sep. 16, 2021.

* cited by examiner

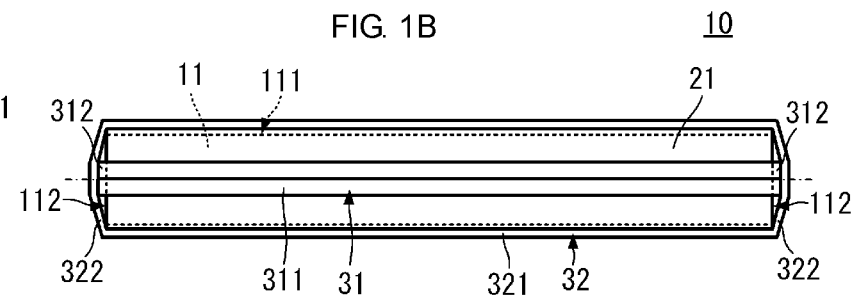
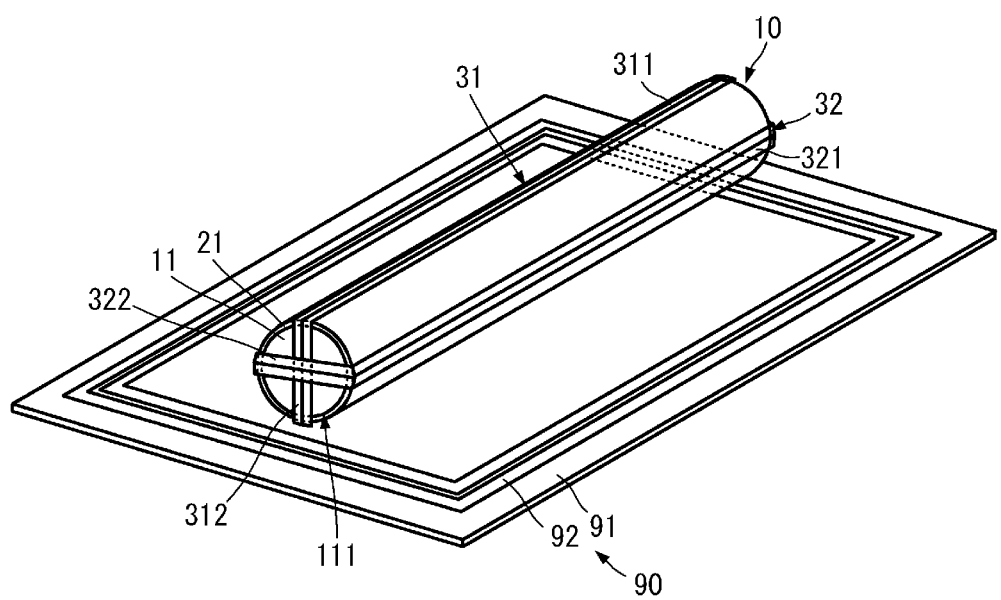
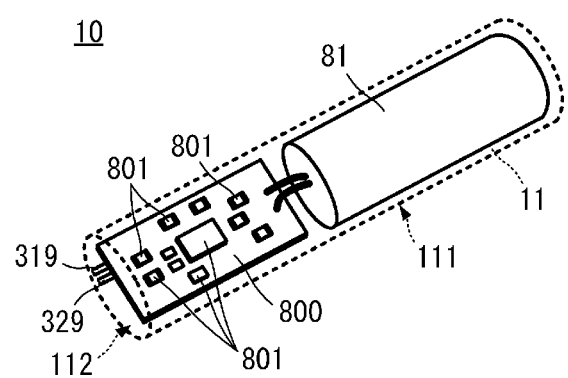

POWER RECEPTION DEVICE FOR WIRELESS POWER SUPPLY SYSTEM

CROSS-REFERENCE TO RELATED APPLICATIONS

This application claims benefit of priority to International Patent Application No. PCT/JP2019/048099, filed Dec. 9, 2019, and to Japanese Patent Application No. 2019-049333, filed Mar. 18, 2019, the entire contents of each are incorporated herein by reference.

BACKGROUND

Technical Field

The present disclosure relates to a power reception device that is wirelessly supplied with power.

Background Art

International Publication No. 2014/181462 discloses a wirelessly rechargeable battery. The rechargeable battery disclosed in International Publication No. 2014/181462 includes a cylindrical battery body and a power-receiving coil. The power-receiving coil is wound in at most a single layer around an outer peripheral side surface of the battery body.

Japanese Patent No. 5798407 discloses a contactless rechargeable secondary battery. The contactless rechargeable secondary battery disclosed in Japanese Patent No. 5798407 includes a plurality of power-receiving coils. The power-receiving coils are each annular in shape.

SUMMARY

The downside to the rechargeable battery disclosed in International Publication No. 2014/181462 is that the roll angle at which a high degree of magnetic coupling between a power-receiving coil and a power-transmitting coil is achievable falls within narrow limits. That is, the orientation of the rechargeable battery is limited in return for a high degree of magnetic coupling.

The downside to the contactless rechargeable secondary battery disclosed in Japanese Patent No. 5798407 is that not all the power-receiving coils are involved in providing coupling between a power-receiving coil and a power-transmitting coil. This can result in a decrease in power reception efficiency.

Accordingly, the present disclosure provides a power reception device that achieves high-efficiency power reception that is less dependent on its orientation relative to a power transmission device.

According to the present disclosure, a power reception device for a wireless power supply system includes a columnar body, a plurality of power-receiving coils, a plurality of resonance capacitors, a plurality of discrete rectifier elements, and a convergent output smoothing capacitor. The columnar body has a space defined therein. The plurality of power-receiving coils are arranged along an exterior of the columnar body. The plurality of resonance capacitors are connected respectively to at least two of the plurality of power-receiving coils to form a plurality of resonant circuits. The plurality of discrete rectifier elements are electrically connected respectively to the at least two of the plurality of power-receiving coils. The convergent output smoothing capacitor is electrically connected to the plurality of discrete rectifier elements. Electric energy output from the plurality of discrete rectifier elements converges in the convergent output smoothing capacitor for storage and supply of power.

Any one of the plurality of power-receiving coils and a power-transmitting coil provide a high degree of magnetic field coupling. Flows of electric power received by the respective power-receiving coils are discretely rectified and are then stored. Thus, this configuration eliminates or reduces the possibility that the output power will be adversely affected by a power-receiving coil with a low degree of magnetic field coupling. Meanwhile, a power-receiving coil with a high degree of magnetic field coupling will not be hindered from adding to the output power.

The present disclosure enables high-efficiency power reception that is less dependent on the orientation of a power reception device relative to a power transmission device.

BRIEF DESCRIPTION OF THE DRAWINGS

FIGS. 1A and 1B are an end view and a side view, respectively, of a power reception device according to a first embodiment;

FIG. 2 is a perspective view of the power reception device according to the first embodiment, illustrating a state in which the power reception device is disposed on a power transmission device;

FIG. 3 is a perspective view of the power reception device according to the first embodiment, illustrating the internal structure of the power reception device;

DETAILED DESCRIPTION

First Embodiment

Figure 4A:
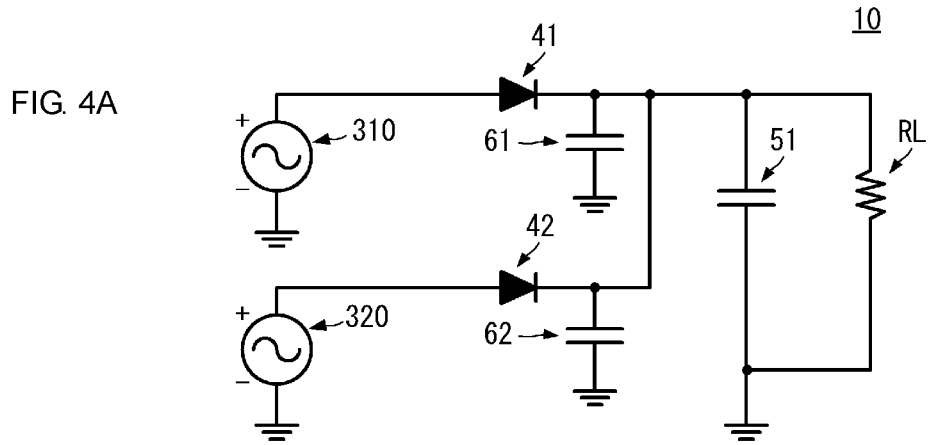
FIG. 4A illustrates a first form of the circuit configuration of the power reception device according to the first embodiment.

Hereinafter, a power reception device according to a first embodiment of the present disclosure will be described with reference to the accompanying drawings. FIGS. 1A and 1B are an end view and a side view, respectively, of a power reception device 10 according to the first embodiment. FIG. 2 is a perspective view of the power reception device 10 according to the first embodiment, illustrating a state in which the power reception device 10 is disposed on a power transmission device 90. FIG. 3 is a perspective view of the power reception device 10 according to the first embodiment, illustrating the internal structure of the power reception device 10.

Structure of Power Reception Device 10

Referring to FIGS. 1A, 1B, and 2, the power reception device 10 includes a housing 11, a magnetic sheet 21, a power-receiving coil 31, and a power-receiving coil 32.

The housing 11 is a columnar body. More specifically, the housing 11 is cylindrical and has a side surface 111 and two end surfaces 112. The housing 11 has a circular cross section orthogonal to the direction in which the side surface 111 extends. One of the two end surfaces 112 is located on one end in the direction in which the side surface 111 extends, and the other end surface 112 is located on the other end. The housing 11 has a predetermined degree of rigidity. The housing 11 may, for example, be made of metal. The direction in which the side surface 111 extends is orthogonal to the direction in which the side surface 111 is curved; that is, the side surface 111 extends in a direction orthogonal to the end surface 112.

The magnetic sheet 21 covers the side surface 111 of the housing 11.

The power-receiving coil 31 is a winding conductor extending in the form of a line or a strip and includes two first conductor portions 311 and two second conductor portions 312. The first conductor portions 311 correspond to principal conductor portions. The two first conductor portions 311 have their respective ends connected to each other by one of the second conductor portions 312 and also have their respective ends connected to each other by the other second conductor portion 312. That is, the power-receiving coil 31 is shaped in such a manner that the first conductor portions 311 and the second conductor portions 312 are alternately arranged in the direction in which the conductor extends.

The two first conductor portions 311 extend along the side surface 111 of the housing 11. With one of two surfaces of the magnetic sheet 21 being in contact with the housing 11, the two first conductor portions 311 are in contact with the opposite surface of the magnetic sheet 21. One end of each first conductor portion 311 touches one of the two end surfaces 112, and the other end of each first conductor portion 311 touches the other end surface 112. The direction in which the two first conductor portions 311 extend is substantially coincident with the direction in which the side surface 111 extends.

The two first conductor portions 311 extending along the side surface 111 are located on opposite sides. In other words, the housing 11 is sandwiched between the two first conductor portions 311 when viewed from either of the sides on which the end surfaces 112 are located.

One of the second conductor portions 312 is substantially parallel to and substantially adjacent to one of the end surfaces 112. The magnetic sheet 21 may be disposed between one of the second conductor portions 312 and the corresponding end surface 112. The other second conductor portion 312 is substantially parallel to and substantially adjacent to the other end surface 112. The magnetic sheet 21 may be disposed between the other second conductor portion 312 and the corresponding end surface 112.

The power-receiving coil 32 is a winding conductor extending in the form of a line or a strip and includes two first conductor portions 321 and two second conductor portions 322. The first conductor portions 321 correspond to principal conductor portions. The two first conductor portions 321 have their respective ends connected to each other by one of the second conductor portions 322 and also have their respective ends connected to each other by the other second conductor portion 322. That is, the power-receiving coil 32 is shaped in such a manner that the first conductor portions 321 and the second conductor portions 322 are alternately arranged in the direction in which the conductor extends.

The two first conductor portions 321 extend along the side surface 111 of the housing 11. With one of two surfaces of the magnetic sheet 21 being in contact with the housing 11, the two first conductor portions 321 are in contact with the opposite surface of the magnetic sheet 21. One end of each first conductor portion 321 touches one of the two end surfaces 112, and the other end of each first conductor portion 311 touches the other end surface 112. The direction in which the two first conductor portions 321 extend is substantially coincident with the direction in which the side surface 111 extends.

The two first conductor portions 321 extending along the side surface 111 are located on opposite sides. In other words, the housing 11 is sandwiched between the two first conductor portions 321 when being viewed from either of the sides on which the end surfaces 112 are located.

One of the second conductor portions 322 is substantially parallel to and substantially adjacent to one of the end surfaces 112. The magnetic sheet 21 may be disposed between one of the second conductor portions 322 and the corresponding end surface 112. The other second conductor portion 322 is substantially parallel to and substantially adjacent to the other end surface 112. The magnetic sheet 21 may be disposed between the other second conductor portion 322 and the corresponding end surface 112.

The first conductor portions 311 of the power-receiving coil 31 and the first conductor portions 321 of the power-receiving coil 32 are arranged in a manner so as not to coincide with each other in the circumference direction of the side surface 111 (i.e., along the perimeter defined by the side surface 111) of the housing 11. FIGS. 1A, 1B, and 2 illustrate a more concrete example, in which the first conductor portions 311 of the power-receiving coil 31 and the first conductor portions 321 of the power-receiving coil 32 are disposed at about 90° intervals in the circumferential direction of the side surface 111.

An insulator may be disposed between each second conductor portion 312 of the power-receiving coil 31 and each second conductor portions 322 of the power-receiving coil 32 to prevent any short circuit therebetween.

The following describes the other constituent elements of the power reception device 10. Referring to FIG. 3, the power reception device 10 includes a secondary battery 81, a wiring conductor 319, a wiring conductor 329, a circuit board 800, and circuit elements 801. The circuit elements 801 are mounted on the circuit board 800. Capacitors, diodes, transistors, and integrated circuits (ICs) may be included as the circuit elements 801. The wiring conductor 319 forms a connection between the power-receiving coil 31 and the circuit board 800. The wiring conductor 329 forms a connection between the power-receiving coil 32 and the circuit board 800.

The secondary battery 81 may be in the shape of a circular cylinder. The secondary battery 81 is connected to the circuit board 800.

The circuit board 800 having the circuit elements 801 mounted thereon and the secondary battery 81 are disposed within the housing 11, that is, in a cavity defined by the side surface 111 and the end surfaces 112 of the housing 11. The power reception device 10 configured as described above is smaller than if the circuit board 800 and the secondary battery 81 are disposed outside the housing 11. At least part of the housing 11 may be the exterior of the secondary battery 81.

Orientation of Power Reception Relative to Power Transmission Device

Referring to FIG. 2, the power transmission device 90 includes a supporting base 91 and a power-transmitting coil 92. The supporting base 91 has a front surface that is substantially flat. The power-transmitting coil 92 is a winding conductor extending in the form of a line. The power-transmitting coil 92 is wound in parallel to the front surface of the supporting base 91. The power-transmitting coil 92 is connected to a power transmission control unit (not illustrated). The power-transmitting coil 92 is supplied with radio-frequency power transmission from the power transmission control unit.

The power reception device 10 is disposed on the supporting base 91. More specifically, the power reception device 10 is disposed on the supporting base 91 in such a manner that the direction in which the side surface 111 of the housing 11 extends is parallel to the front surface of the supporting base 91.

Thus, the orientation of the power-receiving coil 31 relative to the power-transmitting coil 92 and the orientation of the power-receiving coil 32 relative to the power-transmitting coil 92 vary in accordance with the orientation of the power reception device 10 relative to the supporting base 91.

Referring to FIG. 2, the power-transmitting coil 92 and the power-receiving coil 32 have their respective openings, which are substantially parallel. The power-receiving coil 31 has an opening, which is substantially orthogonal to the opening of the power-transmitting coil 92. The degree of magnetic field coupling (expressed as coupling coefficient K) between the power-transmitting coil 92 and the power-receiving coil 32 is high. Meanwhile, the degree of magnetic field coupling (expressed as coupling coefficient K) between the power-transmitting coil 92 and the power-receiving coil 31 is low.

Suppose that the power reception device in FIG. 2 is rotated 90° in the circumferential direction of the side surface 111 of the power reception device 10. The opening of the power-transmitting coil 92 is substantially orthogonal to the opening of the power-receiving coil 32. The opening of the power-transmitting coil 92 is substantially parallel to the opening of the power-receiving coil 31. The degree of magnetic field coupling (expressed as coupling coefficient K) between the power-transmitting coil 92 and the power-receiving coil 32 is low. Meanwhile, the degree of magnetic field coupling (expressed as coupling coefficient K) between the power-transmitting coil 92 and the power-receiving coil 31 is high.

Suppose that the power reception device in FIG. 2 is rotated 45° in the circumferential direction of the side surface 111 of the power reception device 10. An overlap between the opening of the power-transmitting coil 92 and the opening of the power-receiving coil 32 and an overlap between the power-transmitting coil 92 and the opening of the power-receiving coil 31 each have a predetermined area. The degree of magnetic field coupling (expressed as coupling coefficient K) between the power-transmitting coil 92 and the power-receiving coil 32 and the degree of magnetic field coupling (expressed as coupling coefficient K) between the power-transmitting coil 92 and the power-receiving coil 31 are at a certain level.

Suppose that the power reception device in FIG. 2 is rotated α° in the circumferential direction of the side surface 111 of the power reception device 10. The angle α is predetermined and is in a range of 0 to 359°. The area of the overlap between the opening of the power-transmitting coil 92 and the opening of the power-receiving coil 32 or the area of the overlap between the power-transmitting coil 92 and the opening of the power-receiving coil 31 is equal to or greater than a predetermined value. The degree of magnetic field coupling (expressed as coupling coefficient K) between the power-transmitting coil 92 and one of the power-receiving coils 31 and 32 whose opening overlaps the opening of the power-transmitting coil 92 to a greater extent than the other is higher than a certain level.

The configuration in the present embodiment is advantageous in that the absolute value of the degree of coupling (expressed as coupling coefficient K) between the power-receiving coil 31 and the power-transmitting coil 92 or the absolute value of the degree of coupling (expressed as coupling coefficient K) between the power-receiving coil 32 and the power-transmitting coil 92 is greater than a desired value, irrespective of the orientation of the power reception device 10. If this is not the case, the sum of the absolute value of the degree of coupling (expressed as coupling coefficient K) between the power-receiving coil 31 and the power-transmitting coil 92 or the absolute value of the degree of coupling (expressed as coupling coefficient K) between the power-receiving coil 32 and the power-transmitting coil 92 is greater than a desired value, irrespective of the orientation of the power reception device 10.

The housing 11 of the power reception device 10 is a circular cylinder. Thus, there will be little confusion as to how to position the power reception device 10 properly on the power transmission device 90. It is ensured that the resultant coupling coefficient is equal to or more than the predetermined value, irrespective of the orientation of the power reception device 10.

First Form of Circuit Configuration of Power Reception Device 10

FIG. 4A illustrates a first form of the circuit configuration of the power reception device 10 according to the first embodiment. Referring to FIG. 4A, the power reception device 10 includes a power-receiving resonant circuit 310, a power-receiving resonant circuit 320, a rectifier element 41, a rectifier element 42, a convergent output smoothing capacitor 51, a discrete output smoothing capacitor 61, a discrete output smoothing capacitor 62, and a load RL. The load RL may, for example, be the secondary battery 81 mentioned above.

The power-receiving resonant circuit 310 includes the power-receiving coil 31 and a resonance capacitor. The resonance capacitor (not illustrated) and the power-receiving coil 31 are electrically connected in parallel or in series.

The power-receiving resonant circuit 320 includes the power-receiving coil 32 and a resonance capacitor. The resonance capacitor (not illustrated) and the power-receiving coil 32 are electrically connected in parallel or in series.

The resonance capacitor included in the power-receiving resonant circuit 310 and the resonance capacitor included in the power-receiving resonant circuit 320 may each, for example, be one of the circuit elements 801 mentioned above.

The positive side of the power-receiving resonant circuit 310 is connected to the rectifier element 42, and the negative side of the power-receiving resonant circuit 310 is connected to the reference potential. The positive side of the power-receiving resonant circuit 320 is connected to the rectifier element 41, and the negative side of the power-receiving resonant circuit 320 is connected to the reference potential.

The rectifier elements 41 and 42 may, for example, be diodes. The rectifier elements 41 and 42 correspond to discrete rectifier elements of the present disclosure. The rectifier elements 41 and 42 may each, for example, be one of the circuit elements 801 mentioned above.

The anode of the diode provided as the rectifier element 41 is connected to the positive side of the power-receiving resonant circuit 310. The anode of the diode provided as the rectifier element 42 is connected to the positive side of the power-receiving resonant circuit 320. The cathode of the diode provided as the rectifier element 41 and the cathode of the diode provided as the rectifier element 42 are connected to each other.

One end of the convergent output smoothing capacitor 51 is connected to the cathode of the diode provided as the rectifier element 41 and to the cathode of the diode provided as the rectifier element 42. The other end of the convergent output smoothing capacitor 51 is connected to the (ground) reference potential. The convergent output smoothing capacitor 51 may, for example, be one of the circuit elements 801 mentioned above. The convergent output smoothing capacitor 51 and the load RL are connected in parallel.

One end of the discrete output smoothing capacitor 61 is connected to the cathode of the diode provided as the rectifier element 41. The other end of the discrete output smoothing capacitor 61 is connected to the reference potential. One end of the discrete output smoothing capacitor 62 is connected to the cathode of the diode provided as the rectifier element 42. The other end of the discrete output smoothing capacitor 62 is connected to the reference potential.

This circuit configuration employs peak hold control on the output voltage of the power-receiving resonant circuit 310 and the output voltage of the power-receiving resonant circuit 320 to apply the output voltage to the convergent output smoothing capacitor 51. The convergent output smoothing capacitor 51 is supplied with output power (output electric energy) corresponding the absolute value of the output voltage of the power-receiving resonant circuit 310 or the absolute value of the output voltage of the power-receiving resonant circuit 320, whichever is greater. In this way, the convergent output smoothing capacitor 51 is charged.

Figure 4B:
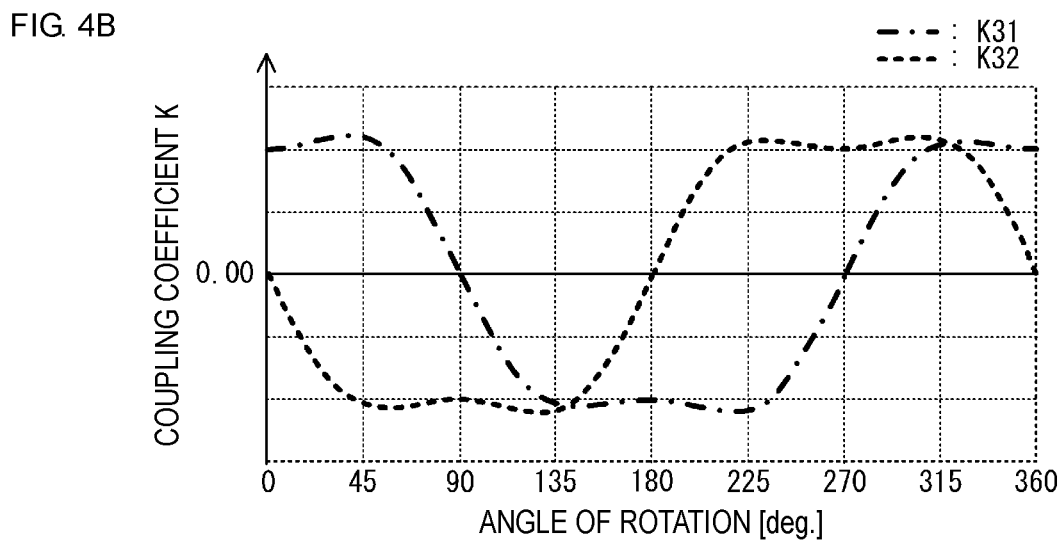
FIG. 4B is a graph illustrating the dependence of the coupling coefficient on the angle of rotation.
Figure 4C:
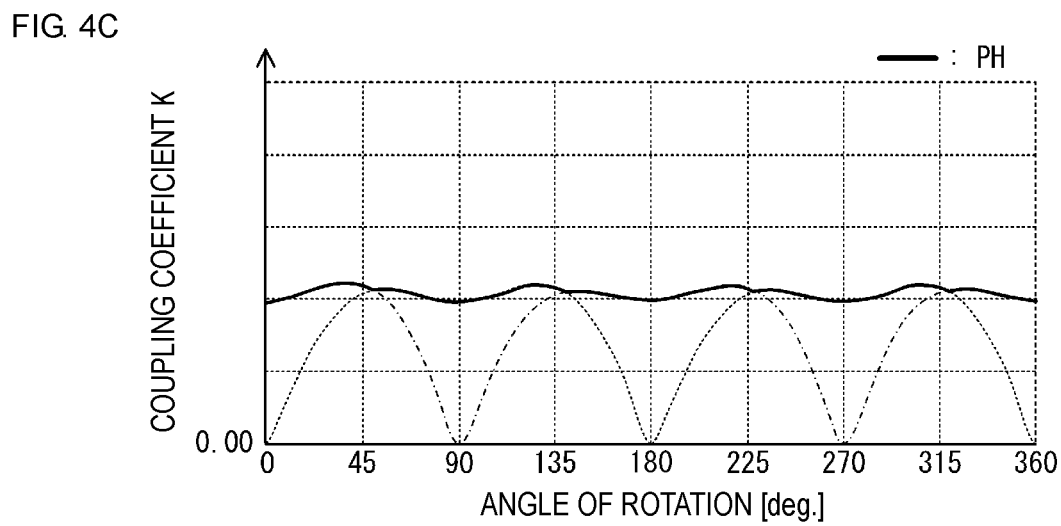
FIG. 4C is a graph illustrating the dependence of the coupling coefficient on the angle of rotation seen looking toward power-receiving resonant circuits from a convergent output smoothing capacitor for the case in which the circuit configuration in FIG. 4A is adopted.

FIG. 4B is a graph illustrating the dependence of the coupling coefficient K on the angle of rotation. FIG. 4C is a graph illustrating the dependence of the coupling coefficient K on the angle of rotation seen looking toward the power-receiving resonant circuits from the convergent output smoothing capacitor for the case in which the circuit configuration in FIG. 4A is adopted. In a state in which a point on the side surface 111 of the power reception device 10 is closer than the remaining part in the circumferential direction of the side surface 111 to the power transmission device 90, the angle of rotation is 0°. The angle of rotation for the case in which the power reception device 10 with an angle of rotation of 0° is rotated $\alpha°$ in the circumferential direction is $\alpha°$. Referring to FIGS. 4B and 4C, the angle of rotation is 0° in a state in which one of the first conductor portions 321 of the power-receiving coil 32 is closer than the other part to the power transmission device 90.

As described above, the degree of coupling (expressed as coupling coefficient K31) between the power-receiving coil 31 and the power-transmitting coil 92 and the degree of coupling (expressed as coupling coefficient K32) between the power-receiving coil 32 and the power-transmitting coil 92 vary in accordance with the orientation of the power reception device 10 relative to the power transmission device 90, that is, in accordance with the angle of rotation of the power reception device 10. This is illustrated in FIG. 4B.

As can be seen from FIG. 4C, the absolute value of the coupling coefficient K31 or the absolute value of the coupling coefficient K32, whichever is greater, is always greater than a predetermined value; that is, the peak hold value (PH) indicated by the solid line in FIG. 4C is always greater than the predetermined value.

The circuit configuration illustrated in FIG. 4A is thus advantageous in that the absolute value of the coupling coefficient K is kept equal to or more than the predetermined value, irrespective of the size of the angle of rotation. Thus, power at or above a predetermined level is supplied to the convergent output smoothing capacitor 51, irrespective of the size of the angle of rotation. In this way, the convergent output smoothing capacitor 51 is charged. This configuration enables the power reception device 10 to achieve high-efficiency power reception that is less dependent on the orientation of the power reception device 10 relative to the power transmission device 90.

Second Form of Circuit Configuration of Power Reception Device 10 (Circuit Configuration of Power Reception Device 10')

Figure 5A:
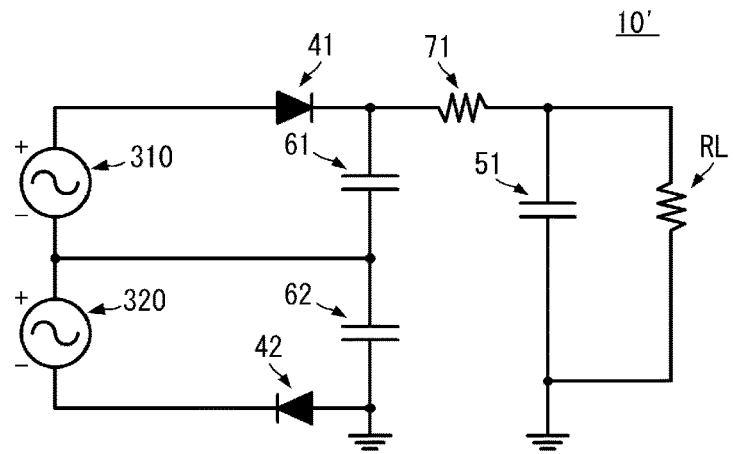
FIG. 5A illustrates the circuit configuration of a power reception device, that is, a second form of the circuit configuration of the power reception device according to the first embodiment.

FIG. 5A illustrates a second form of the circuit configuration of the power reception device according to the first embodiment. Referring to FIG. 5A, a power reception device 10' includes a power-receiving resonant circuit 310, a power-receiving resonant circuit 320, a rectifier element 41, a rectifier element 42, a convergent output smoothing capacitor 51, a discrete output smoothing capacitor 61, a discrete output smoothing capacitor 62, a resistor 71, and a load RL. The load RL may, for example, be the secondary battery 81 mentioned above.

The power-receiving resonant circuit 310 includes the power-receiving coil 31 and a resonance capacitor. The resonance capacitor (not illustrated) and the power-receiving coil 31 are electrically connected in parallel or in series.

The power-receiving resonant circuit 320 includes the power-receiving coil 32 and a resonance capacitor. The resonance capacitor (not illustrated) and the power-receiving coil 32 are electrically connected in parallel or in series.

The resonance capacitor included in the power-receiving resonant circuit 310 and the resonance capacitor included in the power-receiving resonant circuit 320 may each, for example, be one of the circuit elements 801 mentioned above.

The positive side of the power-receiving resonant circuit 310 is connected to the rectifier element 41. The negative side of the power-receiving resonant circuit 310 is connected to the positive side of the power-receiving resonant circuit 320. The negative side of the power-receiving resonant circuit 320 is connected to the rectifier element 42.

The rectifier elements 41 and 42 may, for example, be diodes. The rectifier elements 41 and 42 correspond to discrete rectifier elements of the present disclosure. The rectifier elements 41 and 42 may, for example, be one of the circuit elements 801 mentioned above.

The anode of the diode provided as the rectifier element 41 is connected to the positive side of the power-receiving resonant circuit 310.

The cathode of the diode provided as the rectifier element 42 is connected to the negative side of the power-receiving resonant circuit 320. The anode of the diode provided as the rectifier element 42 is connected to the reference potential.

The discrete output smoothing capacitor 61 and a series circuit including the power-receiving resonant circuit 310 and the rectifier element 41 are connected in parallel. In other words, one end of the discrete output smoothing capacitor 61 is connected to the cathode of the diode provided as the rectifier element 41. The other end of the discrete output smoothing capacitor 61 is connected to the negative side of the power-receiving resonant circuit 310, (the positive side of the power-receiving resonant circuit 320).

The discrete output smoothing capacitor 62 and a series circuit including the power-receiving resonant circuit 320 and the rectifier element 42 are connected in parallel. In other words, one end of the discrete output smoothing capacitor 62 is connected to the positive side of the power-receiving resonant circuit 320 (the negative side of the power-receiving resonant circuit 310 and the other end of the discrete output smoothing capacitor 61). The other end of the discrete output smoothing capacitor 62 is connected to the anode of the diode provided as the rectifier element 41 and to the reference potential.

The discrete output smoothing capacitors 61 and 62 may each, for example, be one of the circuit elements 801 mentioned above.

One end of the resistor 71 is connected to one end of the discrete output smoothing capacitor 61, and the other end of the resistor 71 is connected to one end of the convergent output smoothing capacitor 51. The resistor 71 may, for example, be one of the circuit elements 801 mentioned above.

One end of the convergent output smoothing capacitor 51 is connected to the other end of the resistor 71. The other end of the convergent output smoothing capacitor 51 is connected to the reference potential. The convergent output smoothing capacitor 51 may, for example, be one of the circuit elements 801 mentioned above. The convergent output smoothing capacitor 51 and the load RL are connected in parallel.

The action of the circuit configured as described above is as follows. The output voltage of the power-receiving resonant circuit 310 is applied to the discrete output smoothing capacitor 61, which in turn stores power. The output voltage of the power-receiving resonant circuit 320 is applied to the discrete output smoothing capacitor 62, which in turn stores power. The convergent output smoothing capacitor 51 is supplied with the sum of the power stored in the discrete output smoothing capacitor 61 and the power stored in the discrete output smoothing capacitor 62. That is, the convergent output smoothing capacitor 51 is supplied with the sum of the power output from the power-receiving resonant circuit 310 and the power output from the power-receiving resonant circuit 320. In this way, the convergent output smoothing capacitor 51 is charged.

Figure 5B:
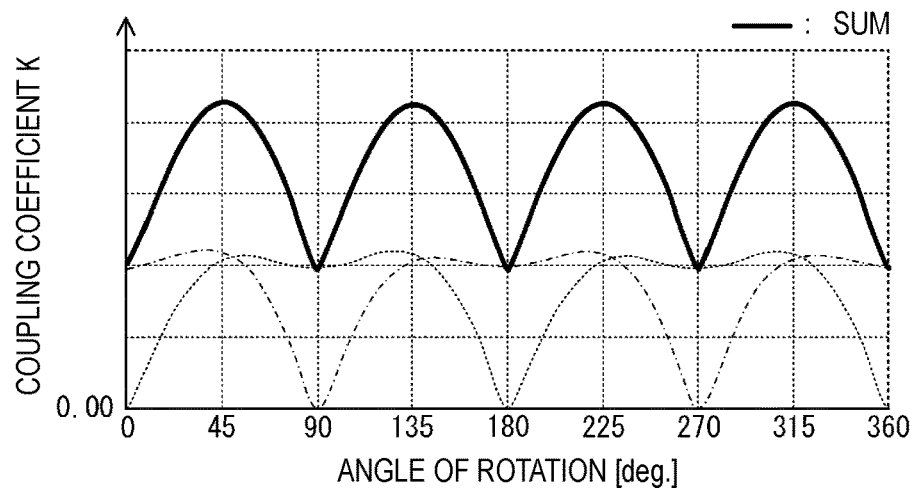
FIG. 5B is a graph illustrating the dependence of the coupling coefficient K on the angle of rotation seen looking toward power-receiving resonant circuits from a convergent output smoothing capacitor for the case in which the circuit configuration in FIG. 5A is adopted.

FIG. 5B is a graph illustrating the dependence of the coupling coefficient K on the angle of rotation seen looking toward the power-receiving resonant circuits from the convergent output smoothing capacitor for the case in which the circuit configuration in FIG. 5A is adopted. The angle of rotation is as defined in relation to the graphs in FIGS. 4B and 4C.

As described with reference to FIG. 4C, the absolute value of the coupling coefficient K31 or the absolute value of the coupling coefficient K32, whichever is greater, is always greater than the predetermined value. As can be seen from FIG. 5B, the coupling coefficient K seen looking from the convergent output smoothing capacitor 51, that is, the sum indicated by the solid line in FIG. 5B is greater than a predetermined value or, more specifically, the peak hold value PH mentioned above, irrespective of the size of the angle of rotation.

The circuit configuration illustrated in FIG. 5A is thus advantageous in that the absolute value of the coupling coefficient K is kept equal to or more than the predetermined value, irrespective of the size of the angle of rotation. Thus, power at or above a predetermined level is supplied to the convergent output smoothing capacitor 51, irrespective of the size of the angle of rotation. In this way, the convergent output smoothing capacitor 51 is charged. This configuration enables the power reception device 10' to achieve high-efficiency power reception that is less dependent on the orientation of the power reception device 10' relative to the power transmission device 90.

The power reception device configured as described above produces various effects, which will be described below. The battery and the electronic elements of the power reception device are accommodated in the housing, which is surrounded by the power-receiving coils and is electrically conductive. The battery and the electric elements are protected from external electromagnetic fields accordingly.

The power reception device configured as described above includes the resonance circuits in which resonance occurs due to the presence of the respective power-receiving coils. The resonance circuits are connected to the respective discrete rectifier elements and the respective discrete output smoothing capacitors. Resonance current flows through the resonant circuits and is rectified and smoothed by the discrete rectifier elements and the discrete output smoothing capacitors. The resultant electric energy converges in the convergent output smoothing capacitor. Consequently, there will be no radio-frequency current flowing between each discrete output smoothing capacitor and the convergent output smoothing capacitor, and the electric power will be conveyed with low power losses accordingly.

The power reception device is designed in such a manner that resonance occurs in the resonance circuits at a predetermined frequency. The power reception device can thus receive a greater amount of power from a magnetic field vibrating at the predetermined frequency, thus enabling a wireless power supply system to achieve improved power efficiency, size reduction, and light weight.

The power-receiving resonant circuits may be circuits of different resonant frequencies. The degree of magnetic coupling between a power-transmitting coil and a power-receiving coil varies in accordance with, for example, the layout of power-receiving coils. It is often the case that as the degree of the magnetic coupling varies, the resonant frequency of the power supply system varies such that a wide range of variation in received power is exhibited. A workaround to this problem is to assign different frequencies to different power-receiving resonant circuits in advance. In this way, stable power reception may be ensured irrespective of changes in the layout of power-receiving coils.

Second Embodiment

Figure 6:
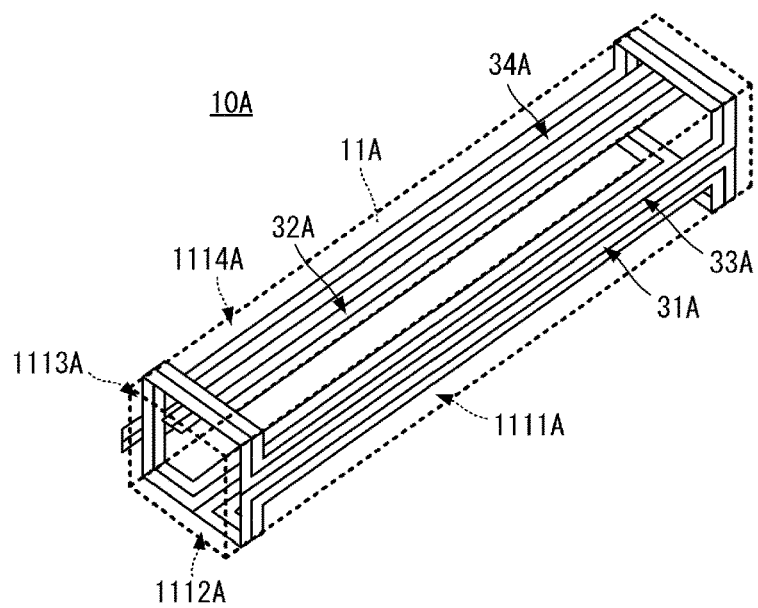
FIG. 6 is a perspective view of a power reception device according to a second embodiment, illustrating a layout of power-receiving coils included in the power reception device.

FIG. 6 is a perspective view of a power reception device 10A according to a second embodiment, illustrating a layout of power-receiving coils included in the power reception device 10A.

As can be seen from FIG. 6, which illustrates the power reception device 10A and a housing 11A included therein, differences between the power reception device 10A according to the second embodiment and the power reception device 10 according to the first embodiment are in the shape of the housing, the shape and number of power-receiving coils, and the layout of the power-receiving coils relative to the housing. The power reception device 10A is otherwise structurally identical to the power reception device 10, and commonality between them will not be described below.

The power reception device 10A according to the second embodiment includes the housing 11A, a power-receiving coil 31A, a power-receiving coil 32A, a power-receiving coil 33A, and a power-receiving coil 34A.

The housing 11A is a rectangular prism (cuboid) and has four side surfaces, which are respectively denoted by 1111A, 1112A, 1113A, and 1114A. The housing 11A may, for example, be made of metal, as may be the housing 11. The housing 11A has a cavity defined by the side surfaces 1111A, 1112A, 1113A, and 1114A. The cavity is rectangular when viewed in section. The side surfaces 1111A and 1113A face each other, and the side surfaces 1112A and 1114A face each other. The side surfaces 1111A, 1112A, 1113A, and 1114A are externally covered with a magnetic sheet (not illustrated).

The power-receiving coils 31A, 32A, 33A, and 34A each extend along any three of the side surfaces 1111A, 1112A, 1113A, and 1114A or, more specifically, three contiguous side surfaces of the housing 11A.

FIGS. 7A, 7B, 7C, and 7D are external perspective views of the power-receiving coils in the second embodiment.

Figure 7A:
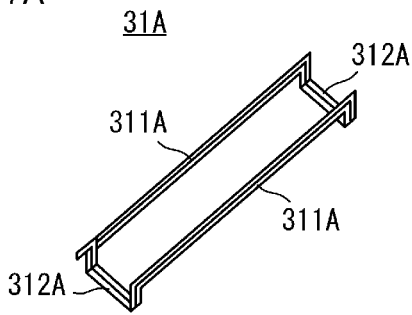
FIGS. 7A, 7B, 7C, and 7D are external perspective views of the power-receiving coils in the second embodiment.

Referring to FIG. 7A, the power-receiving coil 31A is in the form of a winding and includes two first conductor portions 311A and two second conductor portions 312A. The two first conductor portions 311A are linear and extend in parallel. The two first conductor portions 311A are spaced in a direction orthogonal to the direction in which they extend linearly. The two first conductor portions 311A have their respective ends connected to each other by one of the second conductor portions 312A. The two first conductor portions 311A also have their respective ends connected to each other by the other second conductor portion 312A. The two second conductor portions 312A are each bent substantially at a right angle at two points that are spaced in the direction in which the second conductor portions 312A extend. The two second conductor portions 312A extend in parallel.

Figure 7B:
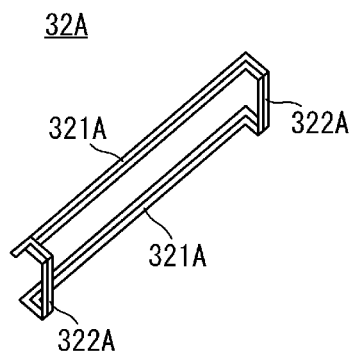

Referring to FIG. 7B, the power-receiving coil 32A is in the form of a winding and includes two first conductor portions 321A and two second conductor portions 322A. The power-receiving coil 32A is structurally identical to the power-receiving coil 31A.

Figure 7C:
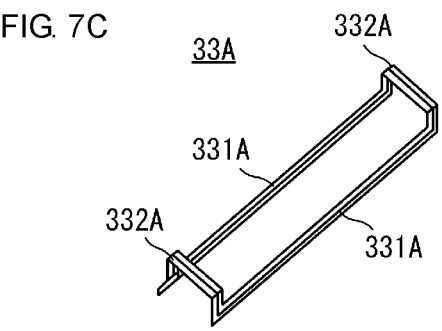

Referring to FIG. 7C, the power-receiving coil 33A is in the form of a winding and includes two first conductor portions 331A and two second conductor portions 332A. The power-receiving coil 33A is structurally identical to the power-receiving coils 31A and 32A.

Figure 7D:
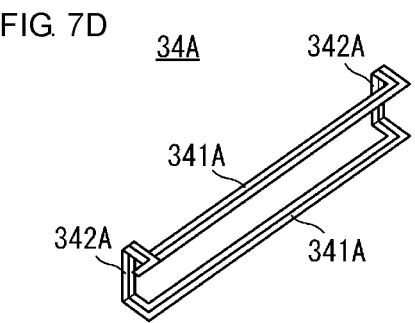

Referring to FIG. 7D, the power-receiving coil 34A is in the form of a winding and includes two first conductor portions 341A and two second conductor portions 342A. The power-receiving coil 34A is structurally identical to the power-receiving coils 31A, 32A, and 33A.

These power-receiving coils are arranged as illustrated in FIG. 6. The first conductor portions (principal conductor portions) of the power-receiving coil 31A extend along the side surfaces 1111A and 1113A, respectively. The second conductor portions of the power-receiving coil 31A each extend along the side surfaces 1111A, 1112A, and 1113A. The first conductor portions (principal conductor portions) of the power-receiving coil 32A extend along the side surfaces 1112A and 1114A, respectively. The second conductor portions of the power-receiving coil 32A each extend along the side surfaces 1112A, 1111A, and 1114A.

The first conductor portions (principal conductor portions) of the power-receiving coil 33A extend along the side surfaces 1111A and 1113A, respectively. The second conductor portions of the power-receiving coil 33A each extend along the side surfaces 1111A, 1114A, and 1113A. The first conductor portions (principal conductor portions) of the power-receiving coil 34A extend along the side surfaces 1112A and 1114A, respectively. The second conductor portions of the power-receiving coil 34A each extend along the side surfaces 1112A, 1113A, and 1114A.

That is, the first conductor portions (principal conductor portions) of the power-receiving coil 31A, the first conductor portions (principal conductor portions) of the power-receiving coil 32A, the first conductor portions (principal conductor portions) of the power-receiving coil 33A, and the first conductor portions (principal conductor portions) of the power-receiving coil 34A are arranged along the side surfaces of the housing 11 in a manner so as to not coincide with each other.

The power reception device 10A produces effects similar to those of the power reception device 10 according to the first embodiment. More specifically, any one of the absolute value of the degree of coupling (expressed as coupling coefficient K) between the power-receiving coil 31A and the power-transmitting coil 92, the absolute value of the degree of coupling (expressed as coupling coefficient K) between the power-receiving coil 32A and the power-transmitting coil 92, the absolute value of the degree of coupling (expressed as coupling coefficient K) between the power-receiving coil 33A and the power-transmitting coil 92, and the absolute value of the degree of coupling (expressed as coupling coefficient K) between the power-receiving coil 34A and the power-transmitting coil 92 is equal to or more than a desired value, irrespective of the orientation of the power reception device 10A. If this is not the case, the sum of the absolute value of the degree of coupling (expressed as coupling coefficient K) between the power-receiving coil 31A and the power-transmitting coil 92, the absolute value of the degree of coupling (expressed as coupling coefficient K) between the power-receiving coil 32A and the power-transmitting coil 92, the absolute value of the degree of coupling (expressed as coupling coefficient K) between the power-receiving coil 33A and the power-transmitting coil 92, and the absolute value of the degree of coupling (expressed as coupling coefficient K) between the power-receiving coil 34A and the power-transmitting coil 92 is equal to or more than the desired value, irrespective of the orientation of the power reception device 10A.

The power-receiving coils 31A, 32A, 33A, and 34A having the specified shape may be easily obtained, as will be described below.

Figure 8A:
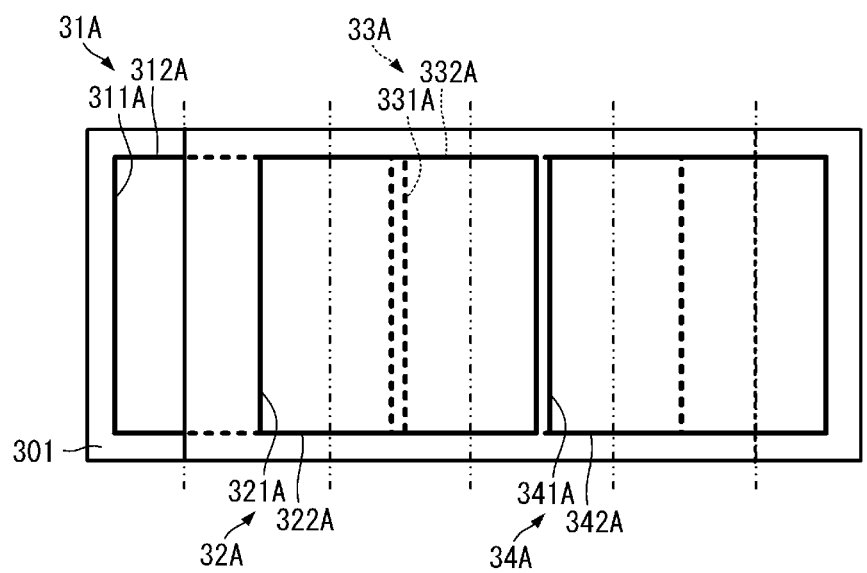
FIGS. 8A and 8B are a plan view and a side view, respectively, of a composite body consisting of the power-receiving coils in the second embodiment, illustrating a state prior to a bending process.
Figure 8B:
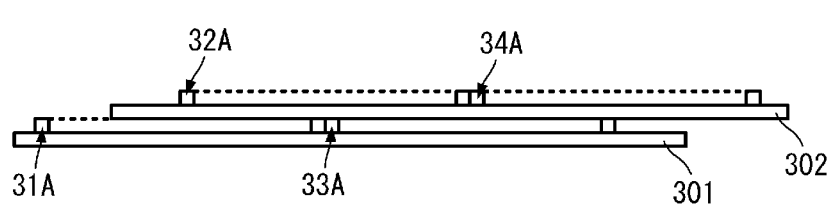

FIGS. 8A and 8B are a plan view and a side view, respectively, of a composite body consisting of the power-receiving coils in the second embodiment, illustrating a state prior to a bending process. Although the power-receiving coils in FIGS. 8A and 8B are each illustrated as a single winding, each power-receiving coil may consist of windings of a conductor pattern extending in the form of a line or a strip.

As can be seen from FIGS. 8A and 8B, the power-receiving coils 31A, 32A, 33A, and 34A viewed in plan in the state prior to the bending process are rectangular. The power-receiving coils 31A, 32A, 33A, and 34A are identical in shape or are substantially identical in shape.

The power-receiving coils 31A and 33A are formed on a front surface of an insulating sheet 301. The insulating sheet 301 is flexible. The power-receiving coils 31A and 33A are disposed with a space therebetween. The first conductor portions 311A of the power-receiving coil 31A are parallel to the first conductor portions 331A of the power-receiving coil 33A. Each of the second conductor portions 312A of the power-receiving coil 31A and the corresponding one of the second conductor portions 332A of the power-receiving coil 33A are aligned in a straight line.

The power-receiving coils 32A and 34A are formed on a front surface of an insulating sheet 302. The insulating sheet 302 is flexible. It is required that the insulating sheets be flexible enough to be bent. The commonly used material of the insulating sheets that may be included in the present disclosure is, for example, polyimide or liquid crystal polymer.

The power-receiving coils 32A and 34A are disposed with a space therebetween. The first conductor portions 321A of the power-receiving coil 32A are parallel to the first conductor portions 341A of the power-receiving coil 34A. Each of the second conductor portions 322A of the power-receiving coil 32A and the corresponding one of the second conductor portions 342A of the power-receiving coil 34A are aligned in a straight line.

The insulating sheet 302 is disposed on the front surface side of the insulating sheet 301. In this state, a back surface of the insulating sheet 302 faces a front surface of the insulating sheet 301.

The insulating sheets 301 and 302 are disposed in such a manner that their respective end portions on each side in a first direction does not coincide with each other. The first direction herein refers to the direction in which adjacent ones of the power-receiving coils are arranged side by side on either of the insulating sheets 301 and 302.

The power-receiving coils 31A and 32A thus overlap each other when viewed in plan. In a region outside the overlap between the power-receiving coil 31A and the power-receiving coil 32A, the power-receiving coil 32A overlaps the power-receiving coil 33A. In a region outside the overlap between the power-receiving coil 32A and the power-receiving coil 33A, the power-receiving coil 33A overlaps the power-receiving coil 34A.

The composite body consisting of the power-receiving coils arranged as described above is bent along dash-dot-dot lines in FIG. 8A. More specifically, the composite body viewed in plan is bent at midpoints between adjacent first conductor portions in such a way as to be creased in the direction in which the first conductor portions extend. The composite body is bent substantially at a right angle. Instead of being bent, the composite body may be curved.

The power-receiving coils 31A, 32A, 33A, and 34A are structured and processed as described above and are then arranged in a manner so as to define a rectangular cavity as illustrated in FIG. 6. In this way, the power-receiving coils 31A, 32A, 33A, and 34A are easily and reliably positioned with respect to each other. Ease of producibility is thus an advantage of the power reception device 10A illustrated in FIG. 6.

First Form of Circuit Configuration of Power Reception Device 10A

Figure 9:
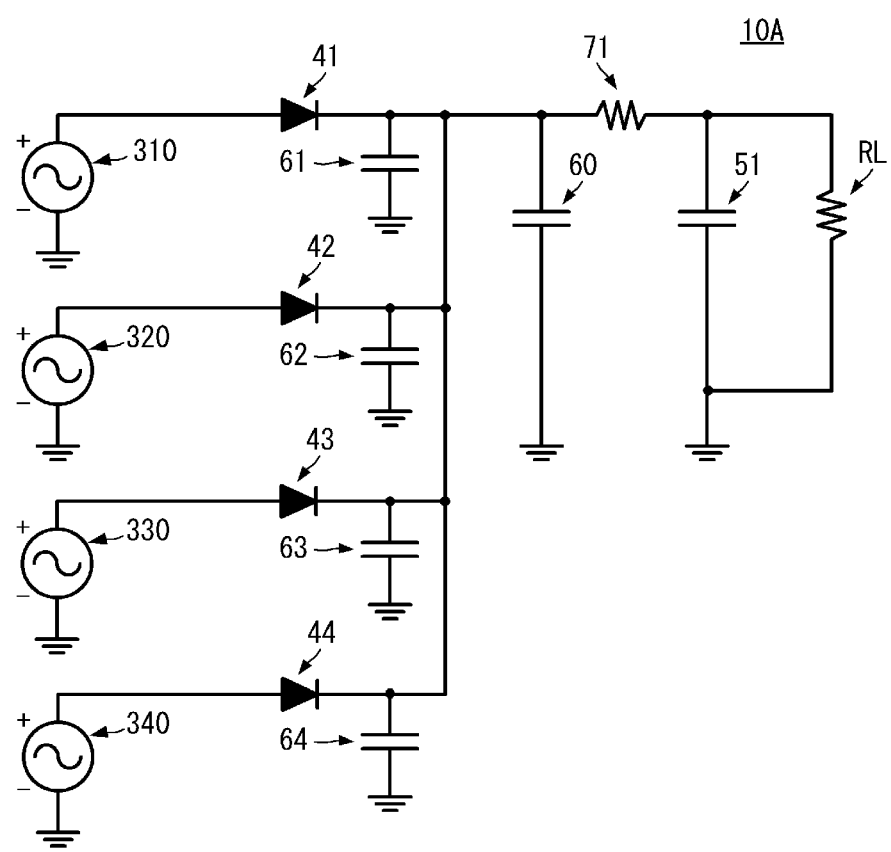
FIG. 9 illustrates a first form of the circuit configuration of the power reception device according to the second embodiment.

FIG. 9 illustrates a first form of the circuit configuration of the power reception device 10A according to the second embodiment. Referring to FIG. 9, the power reception device 10A includes a power-receiving resonant circuit 310, a power-receiving resonant circuit 320, a power-receiving resonant circuit 330, a power-receiving resonant circuit 340, a rectifier element 41, a rectifier element 42, a rectifier element 43, a rectifier element 44, a convergent output smoothing capacitor 51, a common storage capacitor 60, a discrete output smoothing capacitor 61, a discrete output smoothing capacitor 62, a discrete output smoothing capacitor 63, a discrete output smoothing capacitor 64, a resistor 71, and a load RL. The load RL may, for example, be the secondary battery 81 mentioned above.

The power-receiving resonant circuit 310 includes the power-receiving coil 31A and a resonance capacitor. The resonance capacitor (not illustrated) and the power-receiving coil 31A are electrically connected in parallel or in series.

The power-receiving resonant circuit 320 includes the power-receiving coil 32A and a resonance capacitor. The resonance capacitor (not illustrated) and the power-receiving coil 32A are electrically connected in parallel or in series.

The power-receiving resonant circuit 330 includes the power-receiving coil 33A and a resonance capacitor. The resonance capacitor (not illustrated) and the power-receiving coil 33A are electrically connected in parallel or in series.

The power-receiving resonant circuit 340 includes the power-receiving coil 34A and a resonance capacitor. The resonance capacitor (not illustrated) and the power-receiving coil 34A are electrically connected in parallel or in series.

The resonance capacitor included in the power-receiving resonant circuit 310, the resonance capacitor included in the power-receiving resonant circuit 320, the resonance capacitor included in the power-receiving resonant circuit 330, and the resonance capacitor included in the power-receiving resonant circuit 340 may each, for example, be one of the circuit elements 801 mentioned above in relation to the first embodiment.

The positive side of the power-receiving resonant circuit 310 is connected to the rectifier element 41, and the negative side of the power-receiving resonant circuit 310 is connected to the reference potential. The positive side of the power-receiving resonant circuit 320 is connected to the rectifier element 42, and the negative side of the power-receiving resonant circuit 320 is connected to the reference potential. The positive side of the power-receiving resonant circuit 330 is connected to the rectifier element 43, and the negative side of the power-receiving resonant circuit 330 is connected to the reference potential. The positive side of the power-receiving resonant circuit 340 is connected to the rectifier element 44, and the negative side of the power-receiving resonant circuit 340 is connected to the reference potential.

The rectifier elements 41, 42, 43, and 44 may, for example, be diodes. The rectifier elements 41, 42, 43, and 44 correspond to discrete rectifier elements of the present disclosure. The rectifier elements 41, 42, 43, and 44 may each, for example, be one of the circuit elements 801 mentioned above.

The anode of the diode provided as the rectifier element 41 is connected to the positive side of the power-receiving resonant circuit 310. The anode of the diode provided as the rectifier element 42 is connected to the positive side of the power-receiving resonant circuit 320. The anode of the diode provided as the rectifier element 43 is connected to the positive side of the power-receiving resonant circuit 330. The anode of the diode provided as the rectifier element 44 is connected to the positive side of the power-receiving resonant circuit 340.

The cathode of the diode provided as the rectifier element 41, the cathode of the diode provided as the rectifier element 42, the cathode of the diode provided as the rectifier element 43, and the cathode of the diode provided as the rectifier element 44 are connected to each other.

One end of the common storage capacitor 60 is connected to nodes between the rectifier elements 41, 42, 43, and 44. The other end of the common storage capacitor 60 is connected to the reference potential. The common storage capacitor 60 may, for example, be one of the circuit elements 801 mentioned above.

One end of the discrete output smoothing capacitor 61 is connected to the cathode of the diode provided as the rectifier element 41. The other end of the discrete output smoothing capacitor 61 is connected to the reference potential. One end of the discrete output smoothing capacitor 62 is connected to the cathode of the diode provided as the rectifier element 42. The other end of the discrete output smoothing capacitor 62 is connected to the reference potential. One end of the discrete output smoothing capacitor 63 is connected to the cathode of the diode provided as the rectifier element 43. The other end of the discrete output smoothing capacitor 63 is connected to the reference potential. One end of the discrete output smoothing capacitor 64 is connected to the cathode of the diode provided as the rectifier element 44. The other end of the discrete output smoothing capacitor 64 is connected to the reference potential.

One end of the resistor 71 is connected to one end of the common storage capacitor 60. The other end of the resistor 71 is connected to the other end of the convergent output smoothing capacitor 51. The resistor 71 may, for example, be one of the circuit elements 801 mentioned above.

One end of the convergent output smoothing capacitor 51 is connected to the other end of the resistor 71. The other end of the convergent output smoothing capacitor 51 is connected to the reference potential. The convergent output smoothing capacitor 51 may, for example, be one of the circuit elements 801 mentioned above. The convergent output smoothing capacitor 51 and the load RL are connected in parallel.

This circuit configuration employs peak hold control on the output voltage of the power-receiving resonant circuit 310, the output voltage of the power-receiving resonant circuit 320, the output voltage of the power-receiving resonant circuit 330, and the output voltage of the power-receiving resonant circuit 340 to apply the output voltage to the convergent output smoothing capacitor 51 through the common storage capacitor 60. The convergent output smoothing capacitor 51 is supplied with output power (electric energy) corresponding to the absolute value of the output voltage of the power-receiving resonant circuit 310, the absolute value of the output voltage of the power-receiving resonant circuit 320, the absolute value of the output voltage of the power-receiving resonant circuit 330, or the absolute value of the output voltage of the power-receiving resonant circuit 340, whichever is the greatest. In this way, the convergent output smoothing capacitor 51 is charged.

Figure 10A:
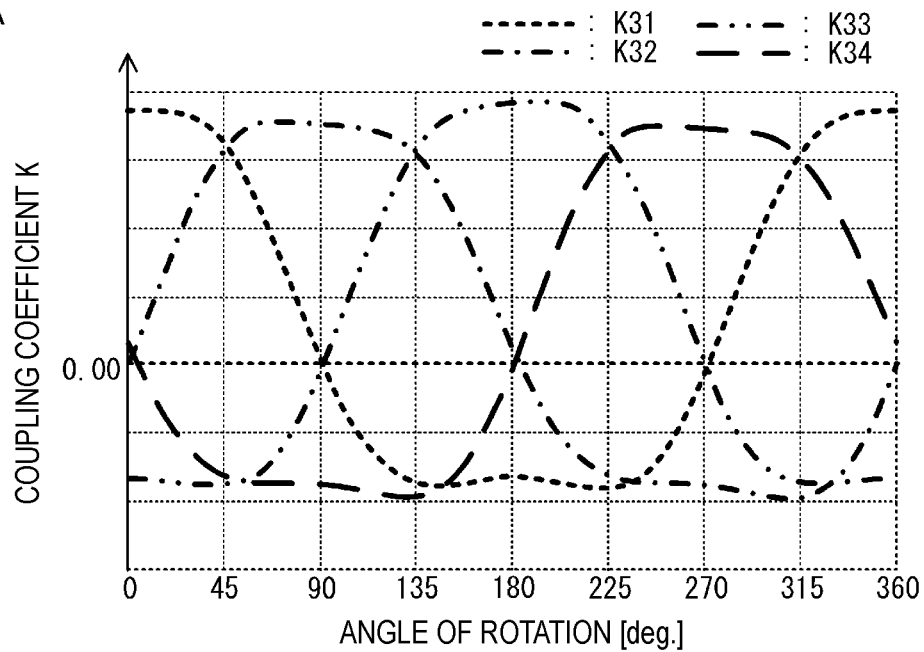
FIG. 10A is a graph illustrating the dependence of the coupling coefficient on the angle of rotation.
Figure 10B:
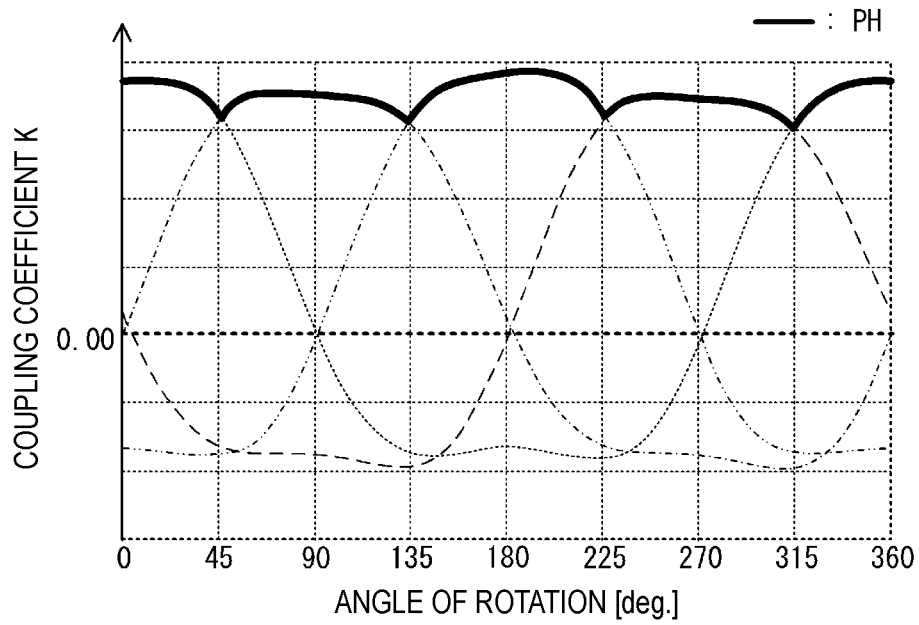
FIG. 10B is a graph illustrating the dependence of the coupling coefficient on the angle of rotation seen looking toward power-receiving resonant circuits from a convergent output smoothing capacitor for the case in which the circuit configuration in FIG. 9 is adopted.

FIG. 10A is a graph illustrating the dependence of the coupling coefficient K on the angle of rotation. FIG. 10B is a graph illustrating the dependence of the coupling coefficient K on the angle of rotation seen looking toward the power-receiving resonant circuits from the convergent output smoothing capacitor for the case in which the circuit configuration in FIG. 9 is adopted. In a state in which a point on the side surface 111 of the power reception device 10 is closer than the remaining part in the circumferential direction of the side surface 111 to the power transmission device 90, the angle of rotation is 0°. The angle of rotation for the case in which the power reception device 10 with an angle of rotation of 0° is rotated $\alpha°$ in the circumferential direction is $\alpha°$. Referring to FIGS. 10A and 10B, the angle of rotation is 0° in a state in which one of the first conductor portions 321A of the power-receiving coil 32A and one of the first conductor portions 341A of the power-receiving coil 34A are closer than the other first conductor portions to the power transmission device 90.

As described above, the degree of coupling (expressed as coupling coefficient K31) between the power-receiving coil 31A and the power-transmitting coil 92, the degree of coupling (expressed as coupling coefficient K32) between the power-receiving coil 32A and the power-transmitting coil 92, the degree of coupling (expressed as coupling coefficient K33) between the power-receiving coil 33A and the power-transmitting coil 92, and the degree of coupling (expressed as coupling coefficient K34) between the power-receiving coil 34A and the power-transmitting coil 92 vary in accordance with the orientation of the power reception device 10A relative to the power transmission device 90, that is, in accordance with the angle of rotation of the power reception device 10A. This is illustrated in FIG. 10A.

As can be seen from FIG. 10B, the absolute value of the coupling coefficient K31, the absolute value of the coupling coefficient K32, the absolute value of the coupling coefficient K33, and the absolute value of the coupling coefficient K34, whichever is the greatest, is always greater than a predetermined value; that is, the peak hold value (PH) indicated by the solid line in FIG. 10B is always greater than the predetermined value.

The circuit configuration illustrated in FIG. 9 is thus advantageous in that the absolute value of the coupling coefficient K is kept equal to or more than the predetermined value, irrespective of the size of the angle of rotation. Thus, power at or above a predetermined level is supplied to the convergent output smoothing capacitor 51, irrespective of the size of the angle of rotation. In this way, the convergent output smoothing capacitor 51 is charged. This configuration enables the power reception device 10A to achieve high-efficiency power reception that is less dependent on the orientation of the power reception device 10A relative to the power transmission device 90.

The power reception device 10A includes four power-receiving coils. The first conductor portions 341A of the power-receiving coil 31A, the first conductor portions 321A of the power-receiving coil 32A, the first conductor portions 331A of the power-receiving coil 33A, and the first conductor portions 341A of the power-receiving coil 34A are arranged in a manner so as not to coincide with each other along the side surfaces of the housing 11A. As the angle of rotation changes, the voltage applied to the convergent output smoothing capacitor 51 varies to a lesser extent. The power reception device 10A can receive power with a higher degree of efficiency accordingly.

The housing 11A of the power reception device 10A is a rectangular prism. Thus, the power reception device 10A placed on the power transmission device 90 is less likely to roll. The power reception device 10A is therefore capable of receiving power reliably and efficiently.

Second Form of Circuit Configuration of Power Reception Device 10A (Circuit Configuration of Power Reception Device 10A')

Figure 11:
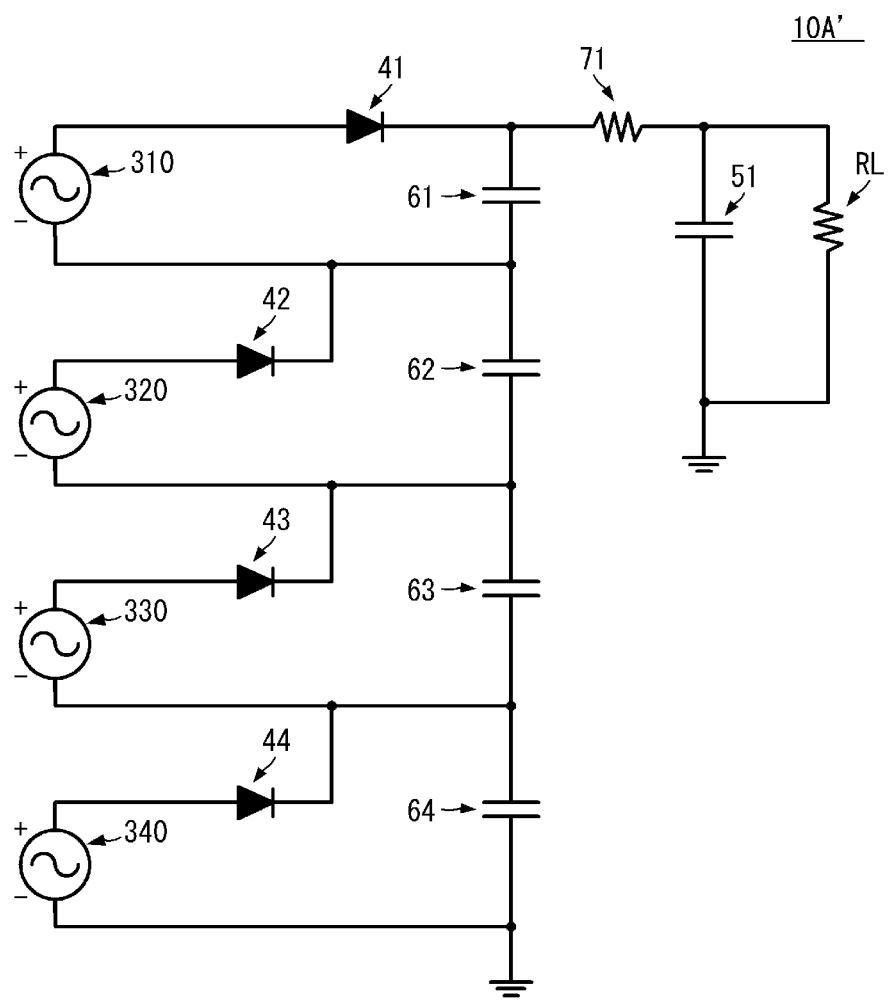
FIG. 11 illustrates the circuit configuration of a power reception device, that is, a second form of the circuit configuration of the power reception device according to the second embodiment.

FIG. 11 illustrates the circuit configuration of the power reception device 10A', that is, a second form of the circuit configuration of the power reception device according to the second embodiment. Referring to FIG. 11, the power reception device 10A' includes a power-receiving resonant circuit 310, a power-receiving resonant circuit 320, a power-receiving resonant circuit 330, a power-receiving resonant circuit 340, a rectifier element 41, a rectifier element 42, a rectifier element 43, a rectifier element 44, a convergent output smoothing capacitor 51, a discrete output smoothing capacitor 61, a discrete output smoothing capacitor 62, a discrete output smoothing capacitor 63, a discrete output smoothing capacitor 64, a resistor 71, and a load RL. The load RL may, for example, be the secondary battery 81 mentioned above.

The power-receiving resonant circuit 310 includes the power-receiving coil 31A and a resonance capacitor. The resonance capacitor (not illustrated) and the power-receiving coil 31A are electrically connected in parallel or in series.

The power-receiving resonant circuit 320 includes the power-receiving coil 32A and a resonance capacitor. The resonance capacitor (not illustrated) and the power-receiving coil 32A are electrically connected in parallel or in series.

The power-receiving resonant circuit 330 includes the power-receiving coil 33A and a resonance capacitor. The resonance capacitor (not illustrated) and the power-receiving coil 33A are electrically connected in parallel or in series.

The power-receiving resonant circuit 340 includes the power-receiving coil 34A and a resonance capacitor. The resonance capacitor (not illustrated) and the power-receiving coil 34A are electrically connected in parallel or in series.

The resonance capacitor included in the power-receiving resonant circuit 310, the resonance capacitor included in the power-receiving resonant circuit 320, the resonance capacitor included in the power-receiving resonant circuit 330, and the resonance capacitor included in the power-receiving resonant circuit 340 may each, for example, be one of the circuit elements 801 mentioned above.

The positive side of the power-receiving resonant circuit 310 is connected to the rectifier element 41. The negative side of the power-receiving resonant circuit 310 and the positive side of the power-receiving resonant circuit 320 are connected to each other with the rectifier element 42 therebetween. The negative side of the power-receiving resonant circuit 320 and the positive side of the power-receiving resonant circuit 330 are connected to each other with the rectifier element 43 therebetween. The negative side of the power-receiving resonant circuit 330 and the positive side of the power-receiving resonant circuit 340 are connected to each other with the rectifier element 44 therebetween. The negative side of the power-receiving resonant circuit 340 is connected to the reference potential.

The rectifier elements 41, 42, 43, and 44 may, for example, be diodes. The rectifier elements 41, 42, 43, and 44 correspond to discrete rectifier elements of the present disclosure. The rectifier elements 41, 42, 43, and 44 may each, for example, be one of the circuit elements 801 mentioned above.

The anode of the diode provided as the rectifier element 41 is connected to the positive side of the power-receiving resonant circuit 310. The cathode of the diode provided as the rectifier element 42 is connected to the negative side of the power-receiving resonant circuit 310. The anode of the diode provided as the rectifier element 42 is connected to the positive side of the power-receiving resonant circuit 320. The cathode of the diode provided as the rectifier element 43 is connected to the negative side of the power-receiving resonant circuit 320. The anode of the diode provided as the rectifier element 43 is connected to the positive side of the power-receiving resonant circuit 330. The cathode of the diode provided as the rectifier element 44 is connected to the negative side of the power-receiving resonant circuit 330. The anode of the diode provided as the rectifier element 44 is connected to the positive side of the power-receiving resonant circuit 340.

The discrete output smoothing capacitor 61 and a series circuit including the power-receiving resonant circuit 310 and the rectifier element 41 are connected in parallel. The discrete output smoothing capacitor 62 and a series circuit including the power-receiving resonant circuit 320 and the rectifier element 42 are connected in parallel. The discrete output smoothing capacitor 63 and a series circuit including the power-receiving resonant circuit 330 and the rectifier element 43 are connected in parallel. The discrete output smoothing capacitor 64 and a series circuit including the power-receiving resonant circuit 340 and the rectifier element 44 are connected in parallel. The discrete output smoothing capacitors 61, 62, 63, and 64 may each, for example, be one of the circuit elements 801 mentioned above.

One end of the resistor 71 is connected to one end of the discrete output smoothing capacitor 61, and the other end of the resistor 71 is connected to one end of the convergent output smoothing capacitor 51. The resistor 71 may, for example, be one of the circuit elements 801 mentioned above.

One end of the convergent output smoothing capacitor 51 is connected to the other end of the resistor 71. The other end of the convergent output smoothing capacitor 51 is connected to the reference potential. The convergent output smoothing capacitor 51 may, for example, be one of the circuit elements 801 mentioned above. The convergent output smoothing capacitor 51 and the load RL are connected in parallel.

The action of the circuit configured as described above is as follows. The output voltage of the power-receiving resonant circuit 310 is applied to the discrete output smoothing capacitor 61, which in turn stores power. The output voltage of the power-receiving resonant circuit 320 is applied to the discrete output smoothing capacitor 62, which in turn stores power. The output voltage of the power-receiving resonant circuit 330 is applied to the discrete output smoothing capacitor 63, which in turn stores power. The output voltage of the power-receiving resonant circuit 340 is applied to the discrete output smoothing capacitor 64, which in turn stores power. The convergent output smoothing capacitor 51 is supplied with the sum of the power stored in the discrete output smoothing capacitor 61, the power stored in the discrete output smoothing capacitor 62, the power stored in the discrete output smoothing capacitor 63, and the power stored in the discrete output smoothing capacitor 64. That is, the convergent output smoothing capacitor 51 is supplied with the sum of the power output from the power-receiving resonant circuit 310, the power output from the power-receiving resonant circuit 320, the power output from the power-receiving resonant circuit 330, and the power output from the power-receiving resonant circuit 340. In this way, the convergent output smoothing capacitor 51 is charged.

As is the case with the power reception device 10', this configuration is advantageous in that the absolute value of the coupling coefficient K of the power reception device 10A' is kept equal to or more than the predetermined value, irrespective of the size of the angle of rotation. Thus, power at or above a predetermined level is supplied to the convergent output smoothing capacitor 51, irrespective of the size of the angle of rotation. In this way, the convergent output smoothing capacitor 51 is charged. This configuration enables the power reception device 10A' to achieve high-efficiency power reception that is less dependent on the orientation of the power reception device 10A' relative to the power transmission device 90.

The power reception device 10A' includes four power-receiving coils, namely, the power-receiving coils 31A, 32A, 33A, and 34A. The power reception efficiency is thus much less dependent on the orientation of the power reception device 10A' relative to the power transmission device 90 and is further enhanced accordingly.

Figure 12:
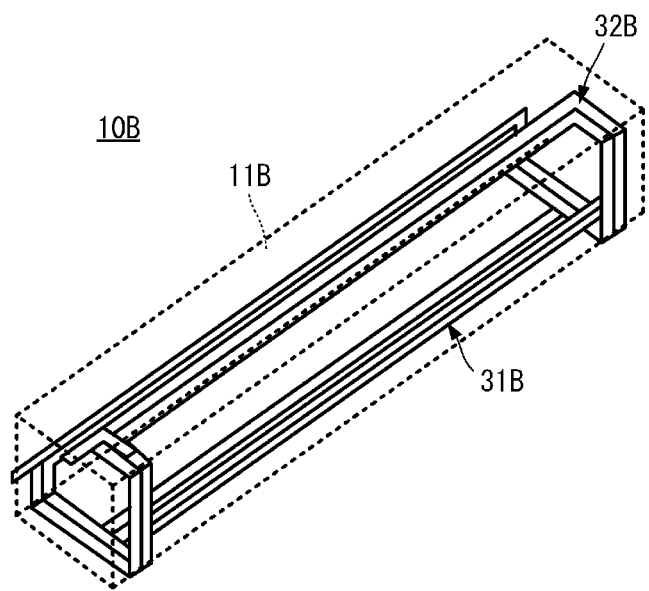
FIG. 12 is a perspective view of a power reception device, illustrating another layout of power-receiving coils included in the power reception device according to the second embodiment.

The power reception devices 10A and 10A' according to the second embodiment each include four power-receiving coils. In some embodiments, a power reception device may be structurally identical to the power reception device 10A or 10A' in all respects except for the number of power-receiving coils. FIG. 12 is a perspective view of a power reception device according to the second embodiment, illustrating another layout of power-receiving coils included in the power reception device.

As can be seen from FIG. 12, which illustrates a power reception device 10B, the difference between the power reception device 10B and the power reception device 10A is in the number of power-receiving coils. The power reception device 10B is otherwise identical to the power reception device 10A, and commonality between them will not be described below.

The power reception device 10B includes a housing 11B, a power-receiving coil 31B, and a power-receiving coil 32B. The housing 11B is identical to the housing 11A. The power-receiving coil 31B is identical to the power-receiving coil 31A, and the power-receiving coil 32B is identical to the power-receiving coil 32A.

This configuration suffices to enable the power reception device 10B to achieve high-efficiency power reception that is less dependent on the orientation of the power reception device 10B relative to the power transmission device 90.

It is not required that four or two power-receiving coils be included. In some embodiments, three power-receiving coils or five or more power-receiving coils are included.

The rectifier elements may be included in circuits of one type selected from the group consisting of half-wave rectifier circuits, full-wave rectifier circuits, voltage-doubler rectifier circuits, and current-doubler rectifier circuits.

It is preferred that the first conductor portions (principal conductor portions) of the power-receiving coils extending along the side surfaces be equally spaced. The variation in received power due to changes in the angle of rotation may thus be reduced even further.

What is claimed is:

1. A power reception device for a wireless power supply system, comprising:
    a columnar body having a space defined therein;
    a plurality of power-receiving coils arranged along an exterior of the columnar body;
    a plurality of resonance capacitors connected respectively to at least two of the plurality of power-receiving coils to configure a plurality of resonant circuits;
    a plurality of discrete rectifier elements electrically connected respectively to the at least two of the plurality of power-receiving coils;
    a plurality of smoothing capacitors, each connected to a respective one of the discrete rectifier elements; and
    a convergent output smoothing capacitor electrically connected to the plurality of discrete rectifier elements, wherein
    electric energy output from the plurality of discrete rectifier elements converges in the convergent output smoothing capacitor for storage and supply of power,
    the columnar body is wrapped with the plurality of power-receiving coils that are arranged in a manner so as not to coincide with each other along a perimeter defined by at least one side surface of the columnar body, and
    the plurality of discrete rectifier elements are disposed within the columnar body.

2. The power reception device for the wireless power supply system according to claim 1, wherein
    the plurality of power-receiving coils are equally spaced along the perimeter of the columnar body.

3. The power reception device for the wireless power supply system according to claim 1, further comprising:
    a magnetic sheet disposed between the columnar body and the plurality of power-receiving coils.

4. The power reception device for the wireless power supply system according to claim 1, wherein
    the plurality of power-receiving coils are each constructed of a bendable insulating sheet and a conductor pattern extending linearly on the bendable insulating sheet.

5. The power reception device for the wireless power supply system according to claim 1, wherein
    the plurality of smoothing capacitors are each connected in series to configure a plurality of series circuits, and
    the plurality of series circuits are connected to the convergent output smoothing capacitor.

6. The power reception device for the wireless power supply system according to claim 1, wherein
    the plurality of resonant circuits each including a corresponding one of the at least two of the plurality of power-receiving coils are circuits of different resonant frequencies.

7. The power reception device for the wireless power supply system according to claim 1, further comprising:
    a secondary battery electrically connected to the convergent output smoothing capacitor, wherein
    the secondary battery is disposed within the columnar body.

8. The power reception device for the wireless power supply system according to claim 1, further comprising:
    a secondary battery electrically connected to the convergent output smoothing capacitor, wherein
    the columnar body is an exterior of the secondary battery.

9. The power reception device for the wireless power supply system according to claim 1, wherein
    the plurality of discrete rectifier elements are respectively included in half-wave rectifier circuits or full-wave rectifier circuits.

10. The power reception device for the wireless power supply system according to claim 1, wherein
    the plurality of discrete rectifier elements are respectively included in voltage-doubler rectifier circuits or current-doubler rectifier circuits.

11. The power reception device for the wireless power supply system according to claim 1, wherein
at least a portion of the columnar body is cylindrical in shape.

12. The power reception device for the wireless power supply system according to claim 1, wherein
at least a portion of the columnar body is cuboid in shape.

13. The power reception device for the wireless power supply system according to claim 2, further comprising:
a magnetic sheet disposed between the columnar body and the plurality of power-receiving coils.

14. The power reception device for the wireless power supply system according to claim 2, wherein
the plurality of power-receiving coils are each constructed of a bendable insulating sheet and a conductor pattern extending linearly on the bendable insulating sheet.

15. The power reception device for the wireless power supply system according to claim 2, wherein
the plurality of smoothing capacitors are each connected in series to configure a plurality of series circuits, and
the plurality of series circuits are connected to the convergent output smoothing capacitor.

16. The power reception device for the wireless power supply system according to claim 2, wherein
the plurality of resonant circuits each including a corresponding one of the at least two of the plurality of power-receiving coils are circuits of different resonant frequencies.

17. The power reception device for the wireless power supply system according to claim 2, further comprising:
a secondary battery electrically connected to the convergent output smoothing capacitor, wherein
the secondary battery is disposed within the columnar body.

* * * * *